June 6, 1961
E. O. MELMER
2,987,011
CONVEYOR INTERCHANGE
Filed Feb. 3, 1958
5 Sheets-Sheet 1
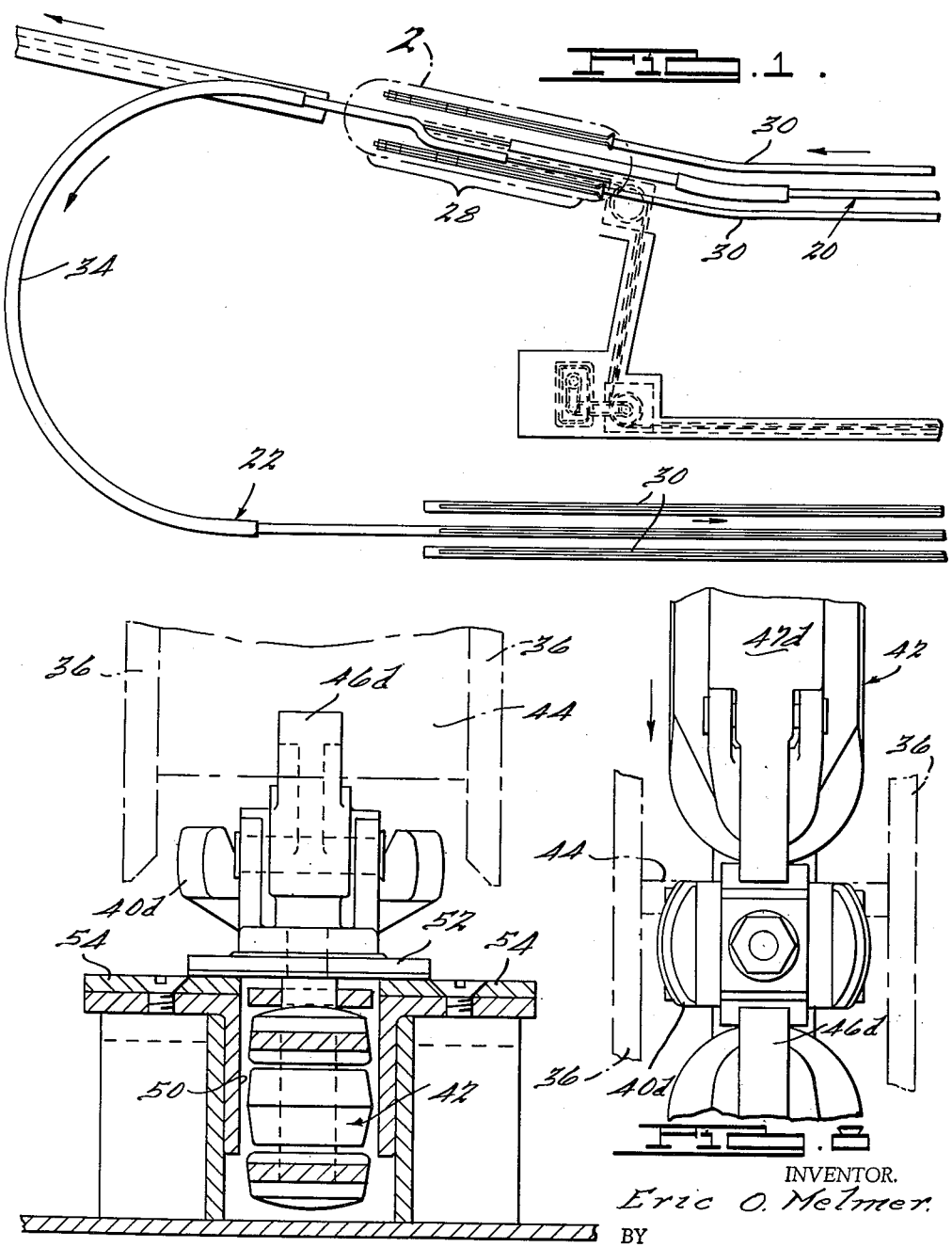
INVENTOR.
Eric O. Melmer.
BY
Haines, Dickey & Pierce
ATTORNEYS.

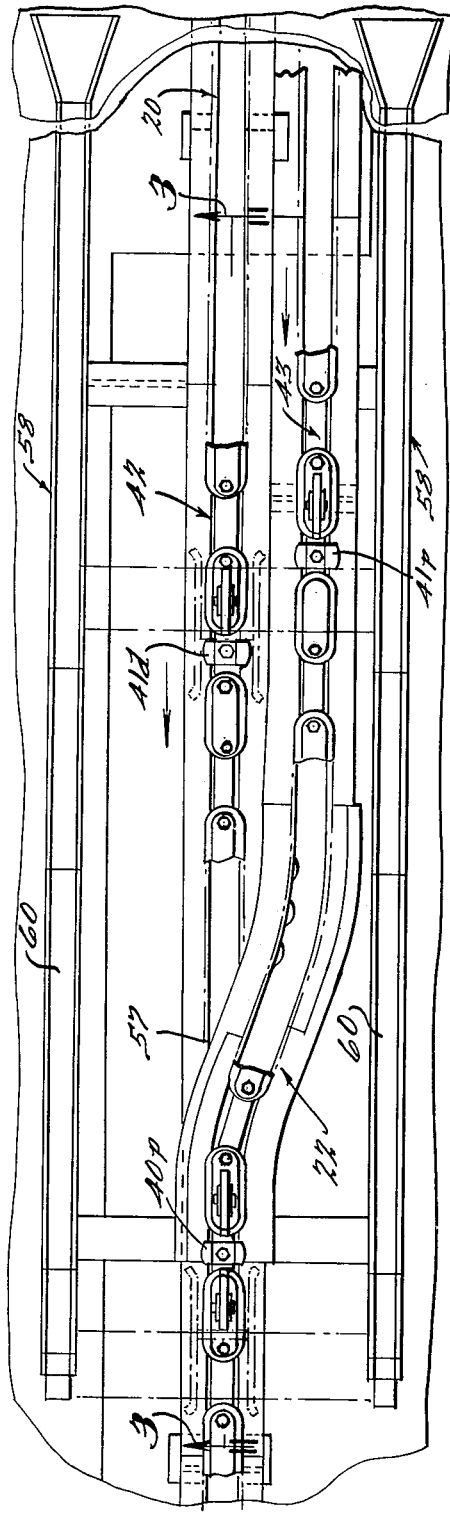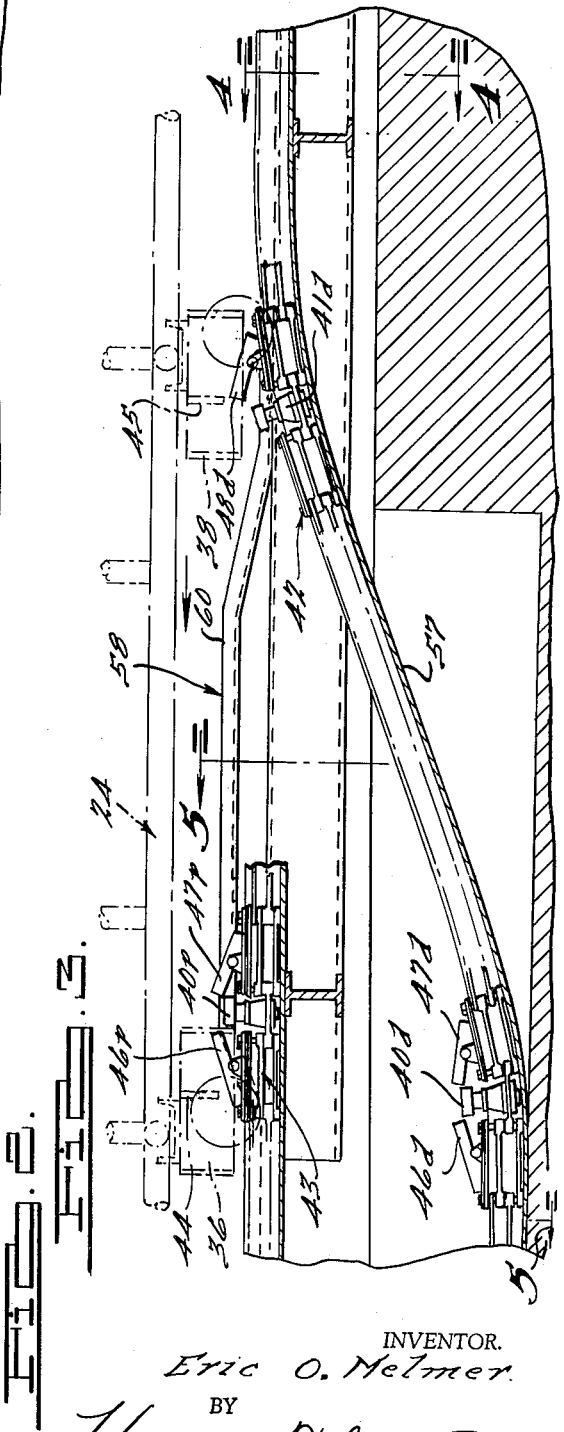

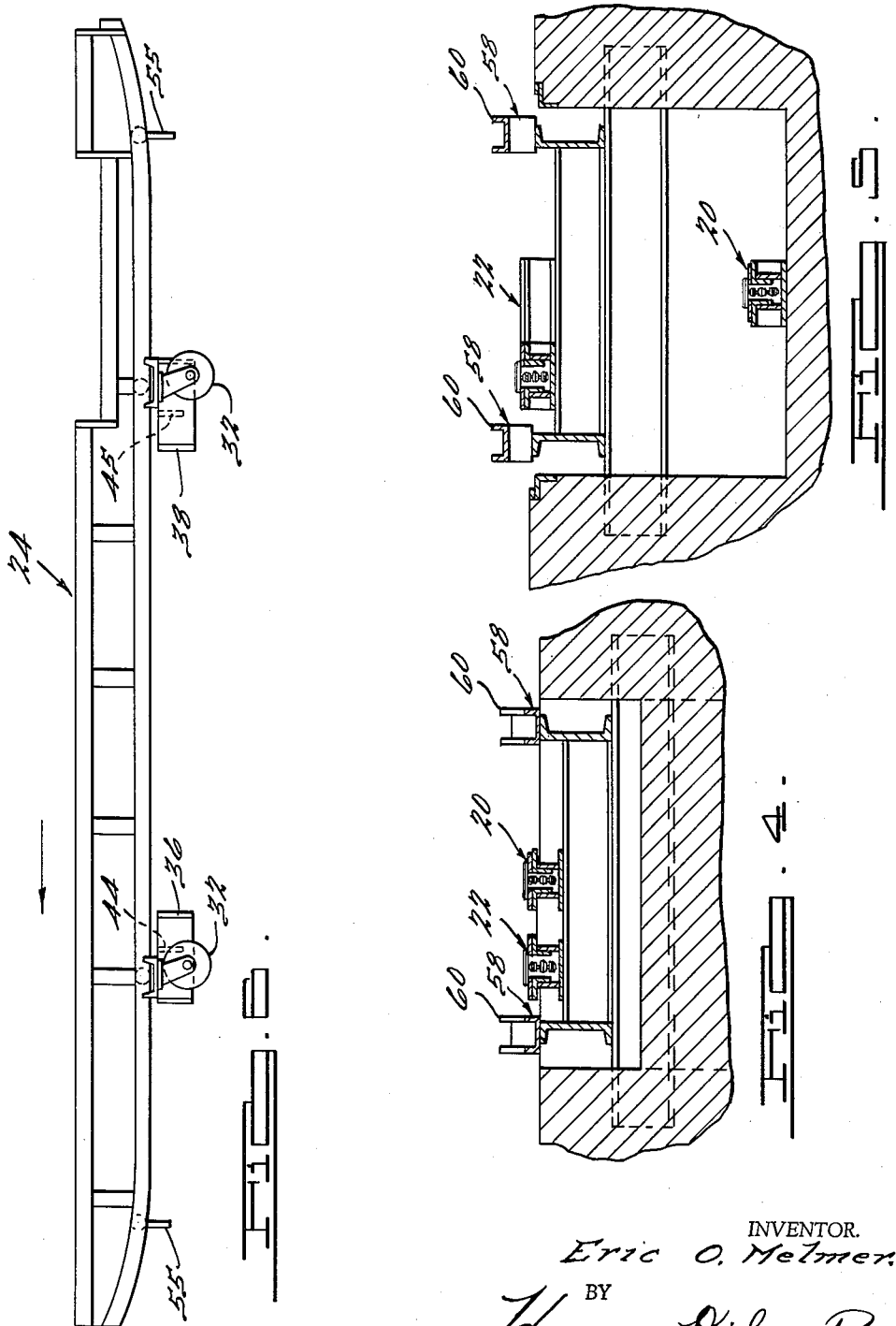

June 6, 1961

E. O. MELMER 2,987,011

CONVEYOR INTERCHANGE

Filed Feb. 3, 1958

INVENTOR.
Eric O. Melmer.
BY
Harness, Dickey & Pierce
ATTORNEYS.

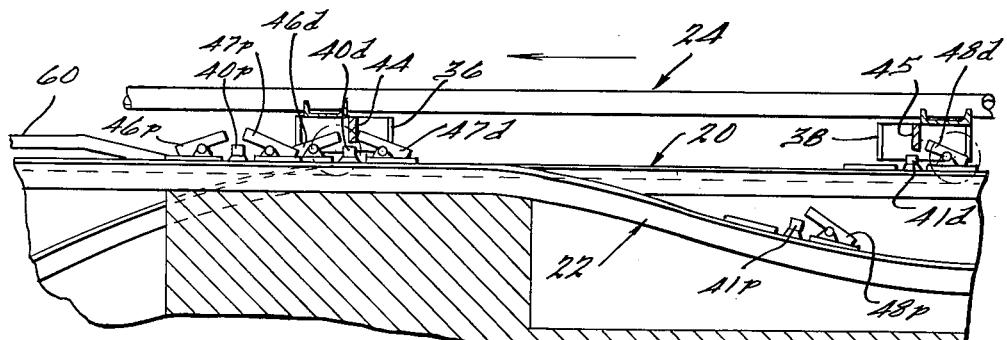
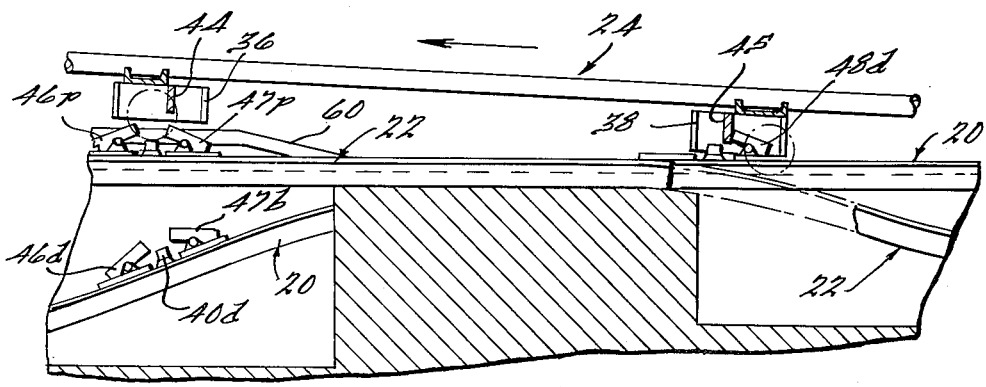
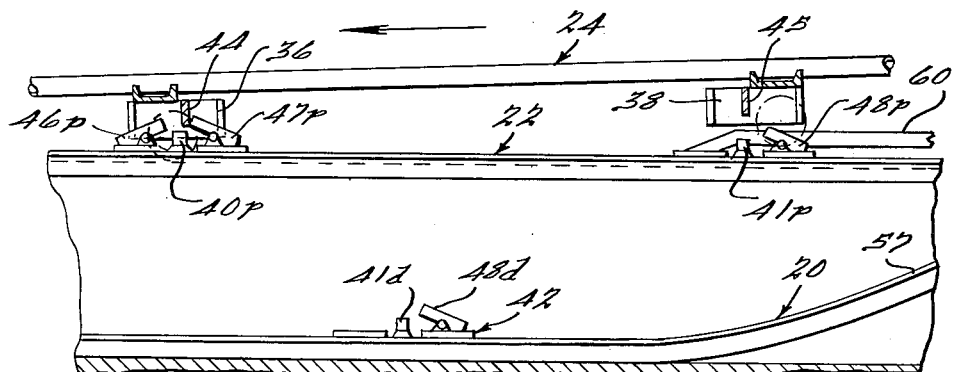

United States Patent Office 2,987,011
Patented June 6, 1961

2,987,011
CONVEYOR INTERCHANGE
Eric Otto Melmer, Grosse Pointe Park, Mich., assignor to Palmer-Bee Company, Detroit, Mich., a corporation of Michigan
Filed Feb. 3, 1958, Ser. No. 712,918
13 Claims. (Cl. 104—172)

This invention pertains to an improved conveyor interchange wherein workpieces are transferred from a first conveyor to a second conveyor in a tow conveyor system.

Automatic conveyor systems are in wide use in the processing industries for transporting workpieces along a series of work stations. In such systems it is often desired to transfer the workpieces from one conveyor to another, such as, for example, where a single conveyor cannot conveniently be arranged around the entire tow path, or where it is desired to vary the spacings between successive workpieces. For maximum efficiency it is generally desired to space the workpieces as closely as possible along the conveyor, but different spacings are often desired at different work stations due to processing differences. For example, it may be desired to space workpieces relatively far apart when they pass through a paint spray booth. And then it may be desired to space them relatively closely together as they next travel through a drying oven.

Accordingly, one important object of the present invention is to provide a conveyor interchange in which workpieces may be transferred directly from one conveyor to another without the use of auxiliary equipment for moving the workpieces.

Another object is to provide an improved arrangement for transferring workpieces from one conveyor to another in a tow conveyor system. Another object is to provide an improved interchange arrangement of a pair of conveyors in a tow conveyor system whereby workpieces may be transferred directly from one conveyor along which they are spaced at predetermined intervals to another conveyor along which they are spaced at different predetermined intervals.

Another object is to provide an improved interchange arrangement of a pair of conveyors in a tow conveyor system whereby workpieces may be transferred directly from one conveyor operated at a first speed to another conveyor operated at a different speed.

Yet another object is to provide in a tow conveyor system of the type in which the conveyors guide the workpieces laterally as well as propelling them fore and aft an improved interchange arrangement of a pair of conveyors for transferring the workpieces directly from one conveyor to another, the workpieces being guided on both conveyors.

These and other objects are achieved by the present invention, one embodiment of which comprises a conveyor interchange construction for transferring workpieces from a delivery conveyor to a pick-up conveyor without the use of an intermediate transfer conveyor. The delivery conveyor is arranged to release the workpieces at a predetermined transfer point, and the pick-up conveyor is arranged to propel the workpieces from the transfer point onward. The construction is particularly adapted for use in tow conveyor systems of the type in which the workpieces are carried on trucks, which are pushed along a predetermined course by conveyor chains. The chains in this type of conveyor are arranged beneath the trucks and carry upwardly projecting guide members and pusher dogs, which engage depending guide and pusher plates, respectively, carried by the trucks for guiding and pushing the trucks along the conveyor path. Typically, each truck is equipped with two longitudinally spaced sets of guide plates, both of which are engaged by the guide members carried by the conveyor chains, so that the truck is also kept in alignment with the chain as well as being pushed and guided thereby. In the interchange of the present invention, the normal guide and pusher members are used, and the guide members of the pick-up chain are enabled to engage both sets of guide members on each truck, thereby keeping the truck under full control.

The invention will now be described in greater detail in connection with the accompanying drawings of which:

FIGURE 1 is a plan view of a portion of an industrial conveyor layout including an interchange according to the present invention;

FIG. 2 is a plan view on an enlarged scale of that portion of the conveyor system shown in FIG. 1 included within the circle 2 thereof, particularly showing the interchange;

FIG. 3 is a longitudinal sectional view of the interchange shown in FIG. 2, taken generally along the section line 3—3 thereof;

FIG. 4 is a cross-sectional view of the interchange illustrated in FIG. 3, taken generally along the section line 4—4 thereof;

FIG. 5 is a cross-sectional view of the interchange shown in FIG. 3, taken generally along the section line 5—5 thereof;

FIG. 6 is a side elevational view of a typical workpiece carrying truck such as is commonly used in a conveyor system of the type with which the present invention is concerned;

FIG. 7 is a cross-sectional view of a conveyor chain of the type used in a typical conveyor system, showing details of the guide member and the driving dogs;

FIG. 8 is a fragmentary plan view of the chain shown in FIG. 7;

FIG. 13 is a longitudinal sectional view of the interchange shown in the preceding figures, showing a truck as it approaches the interchange, this figure being in general correspondence with FIG. 9;

FIG. 14 is a longitudinal sectional view of the interchange shown in the preceding figures showing the truck entering the interchange and generally in the position illustrated schematically in FIG. 10; and FIG. 15 is a longitudinal sectional view of the interchange showing the truck as it leaves the interchange, this view corresponding to the schematic diagram of FIG. 12.

Figure 9:
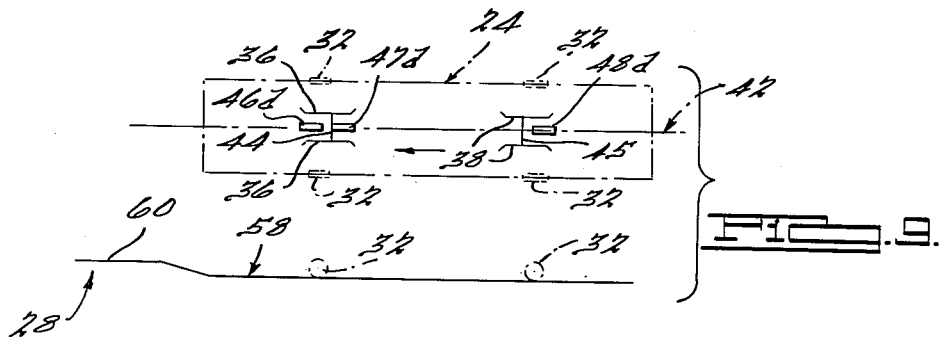
FIG. 9 is a schematic diagram illustrating the operation of the conveyor interchange of the present invention, showing a truck as it approaches the interchange.
Figure 10:
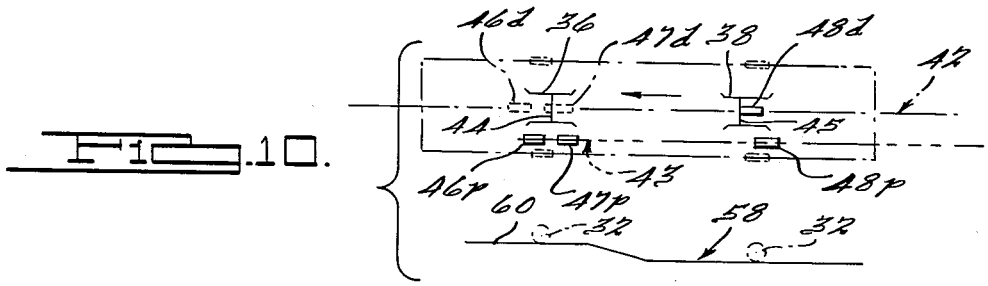
FIG. 10 is a schematic diagram of the conveyor interchange of the present invention, showing a truck in a first position on the interchange.
Figure 11:
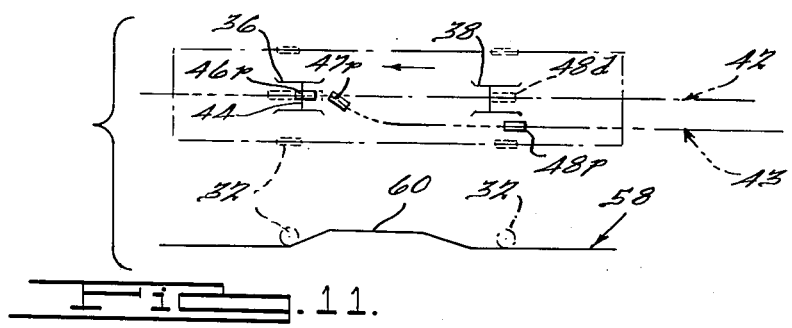
FIG. 11 is a schematic diagram of the interchange showing a truck at the transfer, or pick-up point in the interchange.

The industrial conveyor layout illustrated in FIG. 1 includes a delivery and a pick-up conveyor 20 and 22, respectively, which overlap each other at an interchange 28. The workpieces travel along the delivery conveyor 20 to the interchange 28, and are there transferred to the pick-up conveyor 22. This arrangement may be used, for example, where it is desired to space the workpieces relatively far apart along the delivery conveyor 20, and to space them relatively closely together along the pick-up conveyor 22, in which case the delivery conveyor is operated at a higher speed than the pick-up conveyor.

This differential in spacing is illustrative only, and is in no way limiting in the practice of the invention, which is equally of advantage wherever it is desired to transfer workpieces from one tow conveyor to another, whether or not the workpieces are spaced differently on the two conveyors, and regardless of which conveyor has the greater spacing.

The workpieces are carried by trucks such as the truck 24 shown in FIG. 6, and travel along the delivery conveyor 20 up to the interchange 28 where, as indicated by the dashed lines, the delivery conveyor is trained downwardly. Upon leaving the interchange 28, the trucks travel along the pick-up conveyor 22 in the direction indicated by the arrows.

The present invention is concerned with the arrangement at the interchange 28, which is that portion of the system where the delivery conveyor 20 and the pick-up conveyor 22 overlap each other, and where the trucks 24 are transferred from the delivery conveyor to the pick-up conveyor.

The interchange 28 is especially suited for use in a conveyor system of the type in which the workpiece carrying trucks 24 (FIG. 6) may be guided along at least a portion of their path by the moving element of the conveyor such as the conveyor chain. Along certain portions of the conveyor path, the trucks 24 may be guided by channels 30 disposed along opposite sides of the conveyor chains to receive the casters 32 of the trucks, but along other portions of the conveyor path such as the curved portion 34 of the pick-up conveyor it is often desired to avoid the use of such channels both for economy of material and to minimize interference with possible cross traffic.

In conveyor systems of this type, each one of the trucks 24 is provided with two longitudinally spaced pairs of guide plates 36 and 38, respectively, for receiving similarly spaced upstanding guide pins $40d$ and $41d$, and $40p$ and $41p$ carried by the delivery and pick-up conveyor chains, respectively. The guide plates 36 and 38 are spaced longitudinally at approximately the wheel base length of the truck, and the individual plates of each pair are spaced transversely to loosely receive the guide pins $40d$ and $41d$ or $40p$ and $41p$. Pusher bars 44 and 45 are rigidly fixed between the guide plates of each pair for pushing engagement by driving dogs $46d$, $47d$, and $48d$, or $46p$, $47p$, and $48p$ carried by the delivery and the pick-up chains, respectively. The pusher bars 44 and 45 are shorter than the guide plates 36 and 38 to permit the guide pins $40d$, $41d$, $40p$, and $41p$ to pass freely beneath them.

The pick-up chain 43 is similar in construction to the delivery chain 42, except for the difference in spacing between successive pairs of the guide pins $40d$ and $41d$, and $40p$ and $41p$. The chains 42 and 43 are arranged on edge and are supported in channels 50 by rider plates 52 (FIGS 7 and 8) which are mounted on the upper edges of the chains and slide along wear plates 54 fixed at both sides along the top of the channels. The guide pins $40d$ and $41d$, and $40p$ and $41p$ are secured to the chains 42 and 43, respectively, at spaced intervals therealong corresponding to the spacings between the guide plates 36 and 38 of the trucks and also to the desired spacings between the trucks. The guide pins $40d$, $41d$, $40p$, and $41p$ are all identical to each other, but for purposes of clarity in describing the operation of the interchange, they are separately designated according to which chain they are mounted on and according to whether they engage the front guide plates 36 or the rear guide plates 38 of the trucks. The front guide pins are designated $40d$ and $40p$, and the rear guide pins are designated $41d$ and $41p$. The postscripts $d$ and $p$ indicate that the members so designated are associated with the delivery conveyor 20 and the pick-up conveyor 22, respectively.

A pair of opposed driving dogs $46d$ and $47d$, or $46p$ and $47p$ are pivoted on opposite sides of the front guide pin $40d$ or $40p$. Normally, the dog $47d$ or $47p$ immediately to the rear of the front guide pin $40d$ or $40p$ engages the front pusher bar 44 of the truck for driving the truck along the conveyor path. The forward dog $46d$ or $46p$ is normally idle, and serves as a limit stop to restrain the truck on downwardly sloping portions of its path. A single driving dog $48d$ or $48p$ is pivoted just to the rear of the rear guide pin $41d$ or $41p$. This dog is spaced from the normally engaged front dog $47d$ or $47p$ a slightly greater distance than the spacing between the front and rear pusher bars 44 and 45 of the truck, so that the rear dog $48d$ or $48p$ is normally idle and does not engage the truck during normal operation of the conveyor, except in the operation of the interchange.

It will thus be seen that the trucks are positively guided and held in alignment with the chains 42 and 43 by the guide pins $40d$ and $41d$, or $40p$ and $41p$ which engage each truck at two longitudinally spaced points. The trucks are normally pushed along by the front dog $47d$ or $47p$, which engages the front pusher bar 44, and they may also be pushed by the single dog $48d$ or $48p$ which is positioned to engage the rear pusher bar 45.

Auxiliary pusher bars 55 are mounted on the trucks near the extreme ends thereof for use in conjunction with speed-up conveyors of the type described and claimed in my copending application, Serial No. 698,725, filed November 25, 1957, now abandoned, and entitled, "Speed-Up Conveyor." The auxiliary pusher bars 55 are arranged above the normal pusher bars 44 and 45 and above the dogs $46d$, $47d$, and $48d$, and $46p$, $47p$, and $48p$, and are not used in the operation of the present interchange in which the trucks are transferred by means of the normal pusher bars 44 and 45, and in which the guide plates 36 and 38 are engaged by both of the chains 42 and 43.

The pusher bars 44 and 45 are substantially shorter than the guide plates 36 and 38, thus permitting the guide pins $40d$, $41d$, $40p$ and $41p$ to pass freely beneath the pusher bars. The dogs $46d$, $47d$, $48d$, $46p$, $47p$, and $48p$ normally project high enough to engage the pusher bars. The dogs are clevis mounted and are weighted so that they tend to swing into a raised position, but can pivot downwardly to pass under the pusher bars when necessary.

Returning now to the operation of the interchange, the delivery conveyor 20 pushes the trucks into the interchange 28 and releases them at a predetermined transfer, or pick-up point therein. The pick-up conveyor 22 then engages the trucks at the pick-up point and pulls them away from the interchange.

As shown in FIGS. 1, 2 and 3, the delivery conveyor chain 42 is trained downwardly in the interchange, and releases the trucks by dropping away to a level below its normal path. The pick-up conveyor chain 43 enters the interchange at the lower level along a path horizontally offset from the delivery conveyor chain 42. It is trained upwardly to a position alongside the delivery chain 42, and then laterally over the depressed portion 57 of the delivery chain into alignment therewith. The spacing between the release point, that is, the point at which the delivery chain 42 is depressed just enough to lower its driving dogs $46d$, $47d$, and $48d$ beyond reach of the truck pusher bars 44 and 45, and the point at which the pick-up chain 43 comes into alignment with the delivery chain is slightly shorter than the spacing between the front pusher bar 44 and the rear pusher bar 45. The front pusher dogs $46p$ and $47p$ and guide pin $40p$ of the pick-up chain are thus brought into alignment with the front guide plates 36 and pusher bar 44 in position to engage them when the truck is at the pick-up, or transfer point.

In operation, as perhaps best seen in FIGS. 9-12, the truck 24 approaches the interchange in normal fashion, being propelled by the front driving dog $47d$ of the delivery chain. When the truck 24 enters the interchange, the front driving dog $47d$ travels downwardly and releases the front pusher bar 44 at the release point. The truck then comes to a stop and waits until the rear pusher bar 45 is engaged by the rear driving dog $48d$, which then pushes the truck up to the pick-up point in the interchange, and releases it. The front driving dog 47p of the pick-up chain then engages the front pusher bar 44 and pulls the truck out of the interchange.

The relative timing of the two chains 42 and 43 is important in order to achieve smooth operation of the interchange. The front pusher bar 44 of the truck should reach the pick-up point at least as soon as, and preferably at least slightly before the front driving dog 47p of the pick-up chain.

The interchange also includes a pair of caster guide channels 58 which receive the truck casters 32. These channels 58 serve two principal purposes. First, they guide the trucks and keep them properly aligned while they are being pushed from the rear by the rear dog 48d of the delivery chain. Second, they are raised along a portion of their length to form a bridge 60 spanning the laterally extending portion of the pick-up chain 43. As the trucks travel over the bridge 60, they are raised to permit the driving dogs 46p, 47p, and 48p, and the guide pins 40p and 41p of the pick-up chain to pass beneath the guide plates 36 and 38.

The relative timing of the chains 42 and 43 may be adjusted to avoid the need for the bridge 60 insofar as the front guide plates 36 are concerned, since the delivery chain may be timed to deliver the trucks to the pick-up point before the front dogs 46p and 47p and guide pin 40p pass over the laterally extending portion of their path. But timing cannot facilitate the situation with respect to the rear pick-up guide pin 41p and dog 48p since they are spaced behind the front pin 40p about the same distance as the spacing between the front and rear guide plates 36 and 38. As the truck is towed away from the pick-up point by the front dog 47p, the rear guide pin 41p and the read dog 48p cross under and enter between the rear guide plates 38. The bridge 60 permits this action, enabling the pick-up chain 43 to engage both the front and the rear guide plates 36 and 38, respectively, of the truck.

The rear dog 48d of the delivery chain continues to drive the truck 24 until its front casters pass completely over the bridge 60 and return to the normal operating level, lowering the front guide plates 36 and pusher bar 44 for engagement by the pick-up conveyor. The rear dog 48d then releases the truck, which waits until the front dog 47p of the pick-up chain 43 arrives to engage the front pusher bar 44 and pull the truck away from the interchange. As the rear casters pass over the bridge 60, the rear guide plates 38 are raised, enabling the rear dog 48p and guide pin 41p of the pick-up chain to pass beneath and come into alignment with them.

Figure 12:
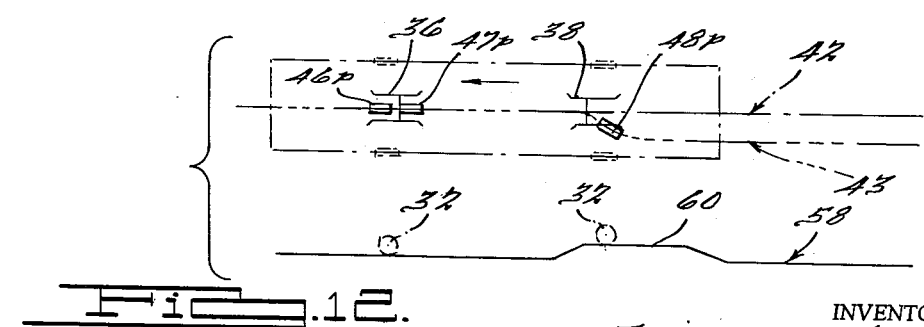
FIG. 12 is a schematic diagram showing the truck leaving the interchange after being picked up by the pick-up conveyor.

This action is illustrated in FIGS. 12 and 15, where it will be seen that the rear guide pin 41p and the rear dog 48p of the pick-up chain pass beneath the rear guide plates 38 and come into alignment therewith just before the rear truck casters leave the bridge 60. The rear guide plates 38 drop down over the rear guide pin 41p as the truck leaves the bridge 60 and travels out of the interchange.

The interchange of the present invention is relatively compact and requires a minimum of floor space. It facilitates efficient transfer of the conveyor trucks 24 from one tow conveyor to another without the use of an auxiliary conveyor, and without sacrificing the lateral guiding engagement between the trucks and the conveyor chains. Also, the elevation and descent of the chains are accomplished along relatively gradual curves, well within the flexibility limitations of the chain-on-edge arrangement.

What is claimed is:

1. In a tow conveyor system of the type in which workpiece carriers are propelled and guided along a predetermined course by a conveyor chain, an interchange arrangement comprising two conveyor chains arranged in sequence along the course and overlapping one another, the first one of said chains being trained downwardly to a level at which it disengages the carriers at a predetermined point in said interchange, the second one of said chains being trained upwardly in said interchange from an inoperative level to an operative level along a path laterally offset from the path of said first chain, said second chain also being trained laterally at said operative level from said offset path into alignment with said first chain.

2. In a tow conveyor system of the type in which workpiece carriers are propelled along a predetermined course by a conveyor chain, and in which the chain carries pairs of longitudinally spaced upwardly projecting guide members for laterally guiding engagement with pairs of similarly spaced depending elements carried by the carriers, an interchange arrangement comprising a pair of conveyor chains arranged in sequence along the course and overlapping one another, each one of said chains including pairs of guide members, the first one of said chains being trained downwardly from an operative to an inoperative level at said interchange to release the carriers at a predetermined transfer point, the second one of said chains being trained upwardly from an inoperative to an operative level alongside of said first chain and being trained into alignment with said first chain over a portion thereof that is below said operative level, and means for raising the carriers as they travel through said interchange to permit the guide members of said second chain to pass beneath the depending elements of the carriers into engaging alignment therewith.

3. In a tow conveyor system of the type in which workpiece carriers are propelled along a first portion of a predetermined course by a delivery conveyor chain and along a second portion of the course by a pick-up conveyor chain, each one of the carriers having at least two longitudinally spaced depending guide plates, and each one of the chains having correspondingly spaced upwardly projecting guide members for lateral guiding engagement with the guide plates, an interchange comprising a terminal portion of the delivery conveyor chain trained downwardly from an operative level to an inoperative level at which inoperative level it is disengaged from the carriers, an initial portion of the pick-up conveyor chain overlapping said terminal delivery chain portion and trained upwardly from an inoperative level to an operative level along a path laterally offset from the delivery conveyor chain, the pick-up conveyor chain being trained laterally at said operative level into alignment with the delivery conveyor chain, auxiliary means for guiding the carriers as they pass over said terminal portion and said initial portion, and means for raising the carriers as they travel over the laterally extending part of the pick-up conveyor chain, said raising means being effective to raise the guide plates fixed to the carriers above the guide members of the pick-up conveyor chain to permit said guide members to cross beneath the guide plates and to come into guiding alignment therewith.

4. In a tow conveyor system of the type in which castered trucks are propelled along a first portion of a predetermined course by a delivery conveyor chain and along a second portion of the course by a pick-up conveyor chain, and in which each one of the trucks carries two longitudinally spaced guide plate and pusher bar assemblies for engagement by correspondingly spaced upwardly projecting guide members and pusher members carried by the chains, an interchange arrangement for transferring the trucks from the delivery chain to the pick-up chain comprising a terminal portion of the delivery chain trained downwardly from an operative to an inoperative level in which inoperative level it is disengaged from the carriers, the delivery chain thereby being operative to propel the carriers to a predetermined point along the course, an initial portion of the pick-up chain overlapping said terminal portion of the delivery chain and trained first upwardly along a path laterally offset from the delivery chain and thence laterally into alignment with the delivery chain over a depressed portion thereof, the spacing between the point at which the delivery chain disengages the trucks and the point at which the pick-up chain first comes into alignment with the delivery chain being less than the spacing between the guide and pusher bar assemblies on the trucks, and means for raising the trucks as they travel over the laterally extending portion of the pick-up chain to permit the pick-up chain guide members to cross beneath the guide and pusher bar assemblies and to come into guiding alignment therewith.

5. A tow conveyor system comprising a delivery conveyor chain, a pick-up conveyor chain trained along a path having an initial portion overlapping a terminal portion of the path of said delivery chain, upwardly projecting guide pins mounted on said chains at intervals therealong for engagement with workpiece carrying trucks to be towed by said chains, said pins being spaced to engage each one of the trucks at two longitudinally spaced points for guiding the trucks laterally and keeping them in alignment with the chains, pusher members mounted on the chains adjacent to said guide pins and operative to engage the trucks at two longitudinally spaced points thereon, said delivery conveyor chain being trained downwardly in said terminal portion of its path from an operative level in which its guide pins are normally in engagement with the trucks to an inoperative level in which its guide pins are disengaged from said trucks, the delivery chain being thereby operative to drive the trucks by engagement therewith at the rear one of said spaced points to a predetermined location at which the front one of said spaced points is positioned over a depressed portion of the delivery chain, said pick-up chain being trained from a lower inoperative position upwardly to an operative position along an inclined path adjacent to and laterally offset from the terminal portion of said delivery chain path, said pick-up chain being trained laterally at said operative level into alignment with said delivery chain over said depressed portion thereof whereby it is aligned to engage a truck at the front one of said spaced points when it is at said predetermined location, and a pair of caster guide channels arranged along said terminal portion of said delivery chain path and positioned to receive the wheels of the trucks propelled and guided by said delivery chain for guiding the trucks while they are being pushed by the rear pusher member of the delivery chain, said guide channels having a raised portion forming a bridge substantially coextensive with the laterally extending part of the pick-up chain for raising the trucks to permit the guide and pusher members of the pick-up chain to pass beneath the engaging elements of the trucks and to come into alignment therewith.

6. A transfer mechanism for use in a tow conveyor system of the type including two conveyor chains arranged in succession and in alignment with each other along a predetermined course for propelling and guiding a workpiece carrier along the course, and alignment means cooperative between the chains and the carrier at two longitudinally spaced points on the carrier for holding the carrier in predetermined alignment with the chains, said mechanism comprising a bridge structure for raising the carrier relative to the chains to permit lateral traverse and vertical motion of the alignment and propelling means at one of the longitudinally spaced points.

7. A transfer mechanism for use in a tow conveyor system of the type including a delivery chain arranged to propel a workpiece carrier to a predetermined transfer point and release the carrier thereat, a pickup chain arranged to engage the carrier at the transfer point and to propel it away therefrom, and alignment means cooperative between the carrier and the chains at two longitudinally spaced points on the carrier for holding the carrier in predetermined alignment with the chain propelling it, said mechanism comprising a bridge structure located along the course of travel of the carrier in the vicinity of the transfer point for raising the carrier relative to the pickup chain to permit lateral traverse and vertical engaging motion of the alignment and propelling means at one of the longitudinally spaced points on the carrier.

8. A transfer mechanism for use in a tow conveyor system of the type including a delivery chain arranged and having means to propel a workpiece carrier to a predetermined transfer point and release the carrier thereat, a pickup chain arranged and having means to engage the carrier at the transfer point and to propel it away therefrom, and alignment means cooperative between the carrier and the chains at two longitudinally spaced points on the carrier for holding the carrier in predetermined alignment with the chain propelling it, said mechanism comprising a bridge structure located along the course of travel of the carrier in the vicinity of the transfer point for raising the carrier relative to the pickup chain to permit lateral traverse and vertical engaging motion of the alignment means and of the propelling means at one of the longitudinally spaced points on the carrier, and guide means associated with said bridge structure for holding the carrier in a predetermined alignment during the traverse and vertical engaging motion of the alignment and propelling means.

9. In a tow conveyor system of the type in which workpiece carriers are propelled along a predetermined course by a plurality of sequentially arranged tow conveyor chains, and in which each one of the chains carries upwardly projecting guide members for laterally guiding engagement with depending elements fixed to the carriers, the members and the elements being arranged to provide guiding engagement between the chains and the carriers at at least two longitudinally spaced points on each carrier, an interchange comprising means for disengaging the carriers from a first one of the chains at a predetermined transfer point, means for engaging the carriers with a second one of the chains at said transfer point, auxiliary guide means for guiding the carriers during a terminal portion of their travel toward said transfer point, and means for raising the carriers as they travel through said terminal portion, said raising means being operative to raise the depending elements of the carriers above the guide members on the second chain to permit crossing travel therebetween.

10. In a tow conveyor system, work carriers having spaced front and rear pusher members, first and second conveyors having aligned portions at a transfer zone in said system and extending in different oblique directions from said transfer zone, said first conveyor having means engageable with the rear pusher members of said carriers for propelling said rear pusher members to a point of delivery in said transfer zone, said second conveyor having means engageable with the front pusher members of said carriers at a pick-up point in said transfer zone, the distance between said delivery point and said pick-up point being less than the distance between the front and rear pusher members of said carriers.

11. In a tow conveyor system, work carriers; spaced front and rear guide members on said carriers; spaced front and rear pusher members on said carriers; first and second conveyors having aligned portions at a transfer zone in said system, said first conveyor having means engageable with the guide members of said carriers to limit lateral movement of the latter with respect to the conveyor, and means engageable with the rear pusher members of said carriers for propelling said rear pusher members to a point of delivery in said transfer zone, said second conveyor also having means engageable with the guide members of said carriers to limit lateral movement of the latter with respect to the conveyor, and means engageable with the front pusher members of said carriers at a pick-up point in said transfer zone, the distance between said delivery point and said pick-up point being less than the distance between the front and rear pusher members of said carriers; and separate means for guiding the carriers during travel thereof between said point of delivery and said pick-up point.

12. In a tow conveyor system, work carriers; spaced front and rear guides on said carriers; spaced front and rear pusher members on said carriers; a first conveyor adapted to deliver said carriers to a transfer zone in said system; a second conveyor adapted to pick up carriers delivered to said transfer zone, said second conveyor extending laterally into said transfer zone and having upstanding front and rear guide members adapted to interlock with the front and rear guides, respectively, of said carriers to limit lateral movement of the latter with respect to the conveyor; and means for raising the carriers as they move from the delivery point to the pick-up point in said transfer zone to interlockingly engage said guide members with said guides.

13. In a tow conveyor system, work carriers having spaced front and rear guides; a first conveyor for moving said work carriers progressively to a point of delivery at a transfer zone in said system; a second conveyor arranged to pick up carriers at said transfer zone, said second conveyor having spaced upstanding guide members adapted to vertically interlock with said guides to limit lateral movement of the carriers with respect to the conveyor; and an arched way in the transfer zone over which said carriers move when being transferred from said first conveyor to said second conveyor, said way adapted to raise said carriers to permit said guide members to move into position under said guides and then lowering said carriers to vertically interlock guide members and said guides.

References Cited in the file of this patent

UNITED STATES PATENTS

| | | |
|---|---|---|
| 1,865,788 | Raymond | July 5, 1932 |
| 2,040,353 | Wilson | May 12, 1936 |
| 2,344,155 | McBride et al. | Mar. 14, 1945 |
| 2,527,244 | Culver | Oct. 24, 1950 |
| 2,580,758 | Gibson | Jan. 1, 1952 |
| 2,635,555 | Hansson | Apr. 21, 1953 |
| 2,660,127 | Boyko et al. | Nov. 24, 1953 |
| 2,688,935 | Brooks | Sept. 14, 1954 |
| 2,868,138 | Bishop et al. | Jan. 13, 1959 |
| 2,868,139 | Klamp | Jan. 13, 1959 |
| 2,875,704 | Yates | Mar. 3, 1959 |